United States Patent [19]

Zhao et al.

[11] Patent Number: 6,163,845

[45] Date of Patent: Dec. 19, 2000

[54] APPARATUS AND METHOD FOR POWER MANAGEMENT OF EMBEDDED SUBSYSTEMS

[75] Inventors: Dongfeng Zhao; F. Matthew Rhodes, both of Irvine, Calif.

[73] Assignee: Conexant Systems, Inc., Newport Beach, Calif.

[21] Appl. No.: 09/165,781

[22] Filed: Oct. 2, 1998

[51] Int. Cl.[7] ..................................... G06F 1/26
[52] U.S. Cl. ................. 713/300; 713/320; 713/323; 713/324
[58] Field of Search .................. 713/300, 320, 713/323, 324; 365/226

[56] References Cited

U.S. PATENT DOCUMENTS

| 5,416,351 | 5/1995 | Ito et al. | 257/357 |
| 5,546,591 | 8/1996 | Wurzburg et al. | |
| 5,724,297 | 3/1998 | Noda et al. | 365/226 |

OTHER PUBLICATIONS

Power Managed Second–Level Cache Control; IBM Technical Disclosure Bulletin, vol. 39, No. 04. Apr. 1996, pp. 79–82.

Automatic Disk Power Reduction For Portable Computers; IMB Technical Disclosure Bulletin, vol. 32, No. 4B, Sep. 1989, pp. 60–61.

*Primary Examiner*—Ario Etienne
*Attorney, Agent, or Firm*—Price and Gess

[57] ABSTRACT

An apparatus and method for power management of embedded electronic subsystems. A power management control circuit for managing power to an embedded subsystem includes a subsystem power node connected to a first section of the embedded electronic subsystem and a bias voltage node connected to a second section of the embedded electronic subsystem. A power switch is connected between a power supply and the subsystem power node. By separating the power subsystem node from the bias voltage node, power can be removed from the subsystem, while still providing the necessary bias voltage to the electronic static discharge (ESD) diodes. This prevents the voltages applied to the system bus by the subsystem from causing bus contention or system bus lock-ups. A power removal and restoration procedure is also disclosed.

17 Claims, 6 Drawing Sheets

POWER DOWN PROCEDURE

1. HALT ALL SYSTEM BUS ACTIVITIES
2. HOLD ALL ESD BIAS POINTS TO HOST POWER SUPPLY
3. HALT ALL SUBSYSTEM ACTIVITIES
4. SWITCH OFF POWER TO THE SUBSYSTEM
5. RESUME SYSTEM BUS ACTIVITIES AFTER SUFFICIENT TIME INTERVAL

FIG. 6

POWER ON PROCEDURE

1. HALT ALL SYSTEM BUS ACTIVITIES
2. HALT ALL SUBSYSTEM ACTIVITIES
3. SWITCH ON POWER TO THE SUBSYSTEM
4. ACTIVATE SYSTEM BUS AND SUBSYSTE AFTER SUFFICIENT TIME INTERVAL
5. RESET SUBSYSTEM FUNCTIONS

FIG. 7

APPARATUS AND METHOD FOR POWER MANAGEMENT OF EMBEDDED SUBSYSTEMS

BACKGROUND OF THE INVENTION

1. Field of the Invention

The present invention relates to the field of power management, and more particularly, to power management of embedded subsystems such as embedded modems.

2. Description of Related Art

With the proliferation of portable, battery-powered electronic devices, power management has become a critical issue for device performance. In order to extend the usable life of the battery power source, sophisticated power management techniques have been employed. In personal computers, the system microprocessor (Intel) and operating system (Microsoft) work together to conserve system power by controlling system resources. Various system devices may be monitored, and power use regulated by cutting or reducing power to inactive devices. For example, after a specified period of inactivity, a timer in the operating system may trigger the system display monitor to enter a "sleep" mode to reduce power consumption. After another interval, the monitor may be completely shutdown, further reducing power consumption. Similarly, power to peripheral devices or plug-in cards can be controlled. These power management techniques work due to the wide adoption of the Intel/Microsoft implemented solutions.

In the embedded device market, however, these solutions are inadequate since many different microprocessors and operating systems are used, each with a different power management scheme. With increased circuit integration, many manufacturers are producing a "system-on-a-chip." In other words, many functions that used to be performed by separate circuitry, are now performed on a single chip. For example, modems may now be embedded into a device, without being a separate peripheral. Unless power management techniques are utilized, the various embedded subsystems can severely drain the battery if they are powered on, but are not used. In the case of a modem, power is continually being consumed even though the user may only access the modem 10% of the time. Since the modem is embedded, it cannot simply be removed. Thus, the "standby" power consumption of the embedded systems is a significant source of power drain. In fact, testing has shown that an embedded modem may draw 6–8 mA of current even in a "stop" mode.

In many prior art attempts to manage power usage in an embedded subsystem, additional power management circuitry is used. This additional circuitry, however, is itself a source of power drain. Also, merely cutting the power to the subsystem does not provide satisfactory results. As shown in FIG. 1, a modem subsystem 2 is connected to a power node 24. In order to disable power to the subsystem when the subsystem is not in use, power supplied through the power node 24 is simply cut-off. This may cause several problems, however. First, since the signal applied to the system bus is indeterminate, the system bus may crash, thereby locking-up the system. The modem may also lock-up or otherwise fail, without special power down processing. Thus, there is a need for an improved power management system for embedded subsystems, such as modems.

SUMMARY OF THE INVENTION

The present invention is an apparatus and method for power management of embedded electronic subsystems. A power management control circuit for managing power to an embedded subsystem includes a subsystem power node connected to a first section of the embedded electronic subsystem and a bias voltage node connected to a second section of the embedded electronic subsystem. A power switch is connected between a power supply and the subsystem power node. By separating the power subsystem node from the bias voltage node, power can be removed from the subsystem, while still providing the necessary bias voltage to the electronic static discharge (ESD) diodes. This prevents the signals applied to the system bus by the subsystem from causing bus contention or system bus lock-ups.

In order to take full advantage of the present invention, the power needs to be removed and restored in a specific order. In order to remove power from a subsystem, all system bus activities must first be halted. The bias voltage to the bias voltage node is maintained. All subsystem activity is suspended and then the power switch is switched to remove power to the power subsystem node. All system bus activities may then be resumed after a sufficient time interval to insure the subsystem discharge has stabilized.

To restore power to the subsystem, all system bus and subsystem activities are halted. Power is restored to the subsystem power node, and system bus activities are resumed after a sufficient time interval. The host system then resets the embedded subsystem.

BRIEF DESCRIPTION OF THE DRAWINGS

The exact nature of this invention, as well as its objects and advantages, will become readily apparent from consideration of the following specification as illustrated in the accompanying drawings, in which like reference numerals designate like parts throughout the figures thereof, and wherein:

FIG. 6 illustrates the steps of the power down procedure according to the present invention; and FIG. 7 illustrates the steps of the power on procedure according to the present invention.

DETAILED DESCRIPTION OF THE PREFERRED EMBODIMENTS

The following description is provided to enable any person skilled in the art to make and use the invention and sets forth the best modes contemplated by the inventor for carrying out the invention. Various modifications, however, will remain readily apparent to those skilled in the art, since the basic principles of the present invention have been defined herein specifically to provide an apparatus and method for power management, and more particularly, to power management of embedded subsystems such as embedded modems.

Figure 1:
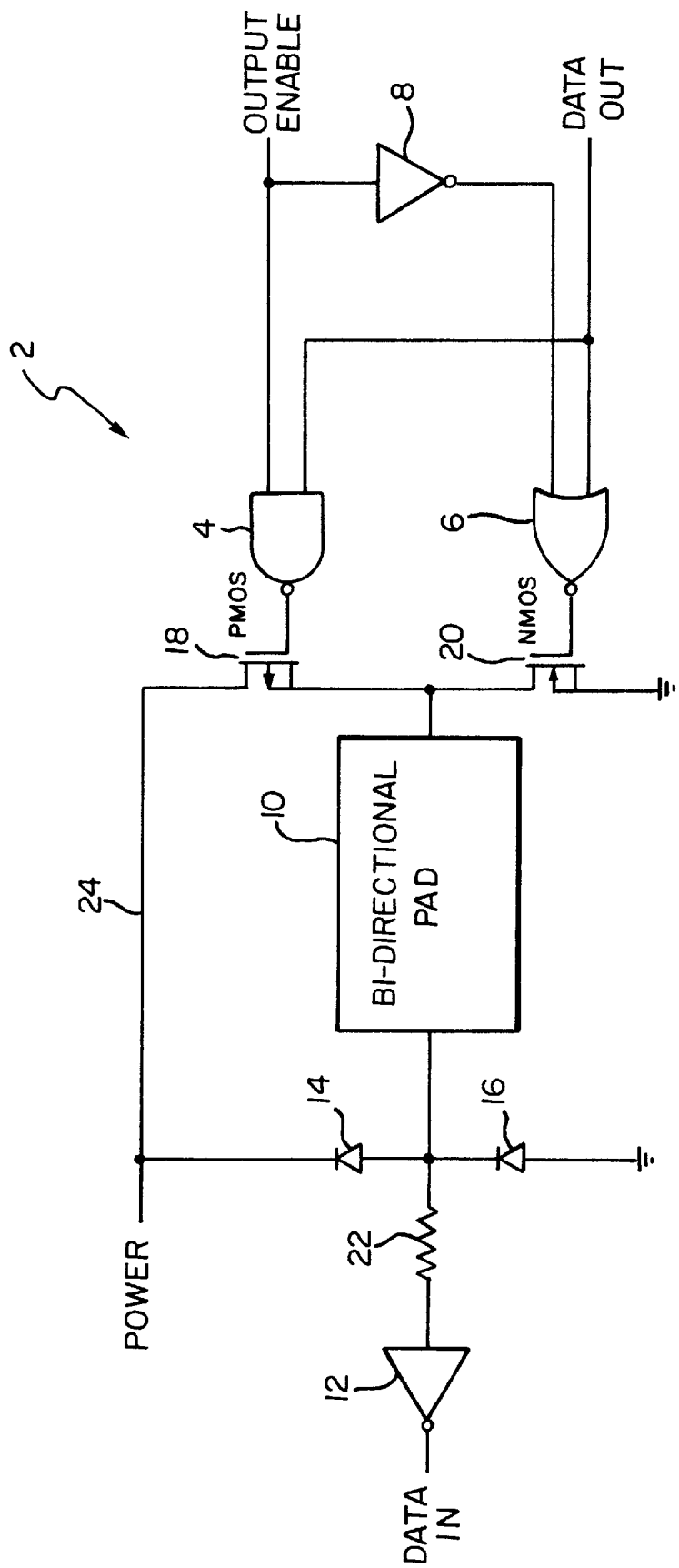
FIG. 1 is a schematic illustrating a prior art solution to power management.
Figure 2:
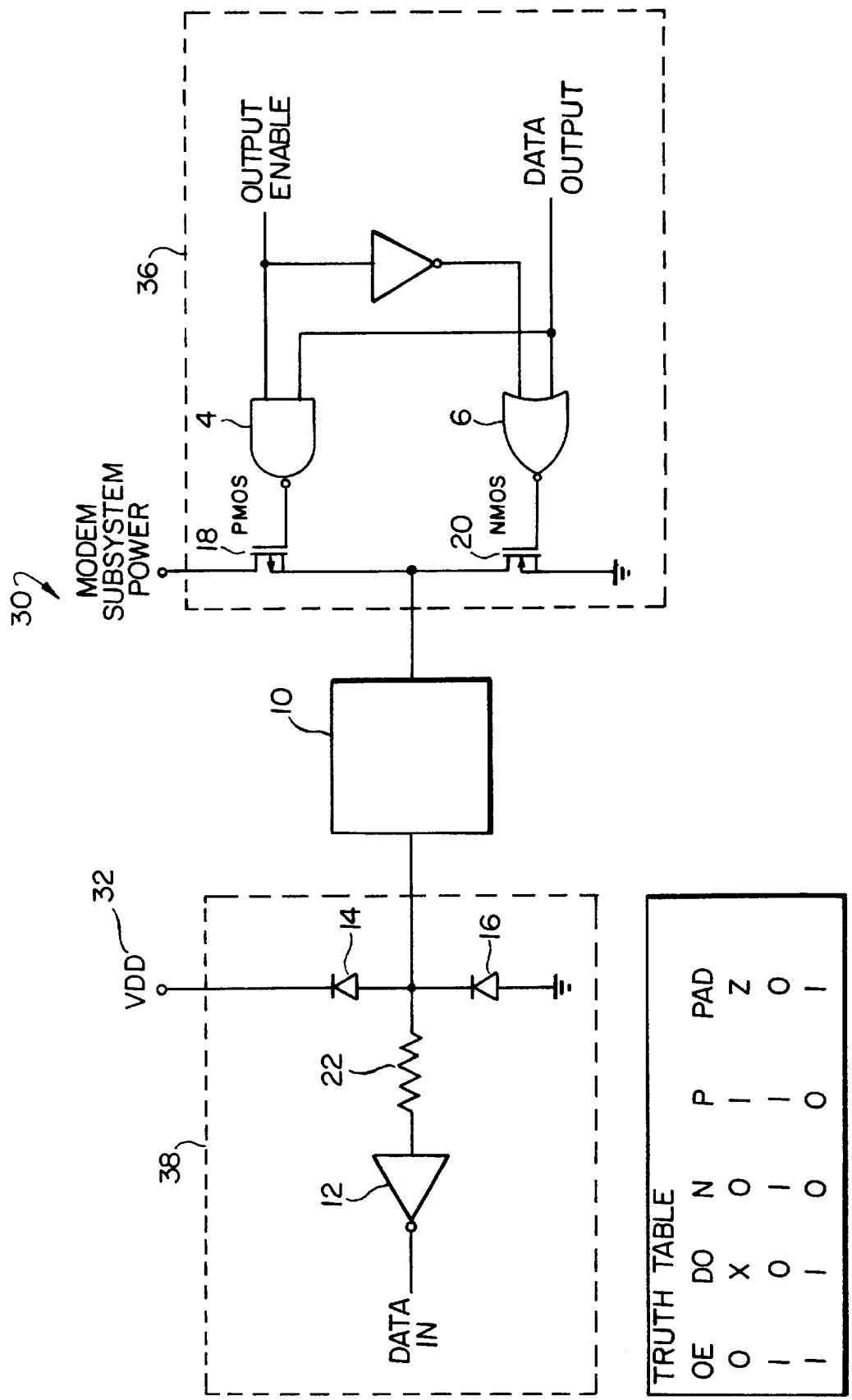
FIG. 2 is a schematic illustrating a power management scheme according to the present invention.

A preferred embodiment of the present invention will now be described with reference to FIG. 2, illustrating a modem subsystem. As those skilled in the art will recognize, however, the present invention may be applied to any similar electronic embedded subsystem. The modem subsystem 30 is divided into two separately powered subsections 36, 38. The output section 36 is powered via a modem subsystem power node 34, while the input section 38 is powered via bias voltage node 32. The output section 36 and the input section 38 are both connected to a pad 10. In order to power down the modem subsystem, power is removed from the modem subsystem power node 34. The power to the bias voltage node 32 is held constant, however. This prevents bus contention on the system bus by maintaining the proper bias voltages to the electrical static discharge (ESD) diodes 14, 16 in the input section 38. Notice that in the prior art circuit of FIG. 1, when power is removed from the modem subsystem, the diodes are no longer biased. Thus, the present circuit removes power to non-essential circuitry of the embedded modem subsystem, while still maintaining the proper bias voltages required by the ESD diodes 14, 16.

Figure 3:
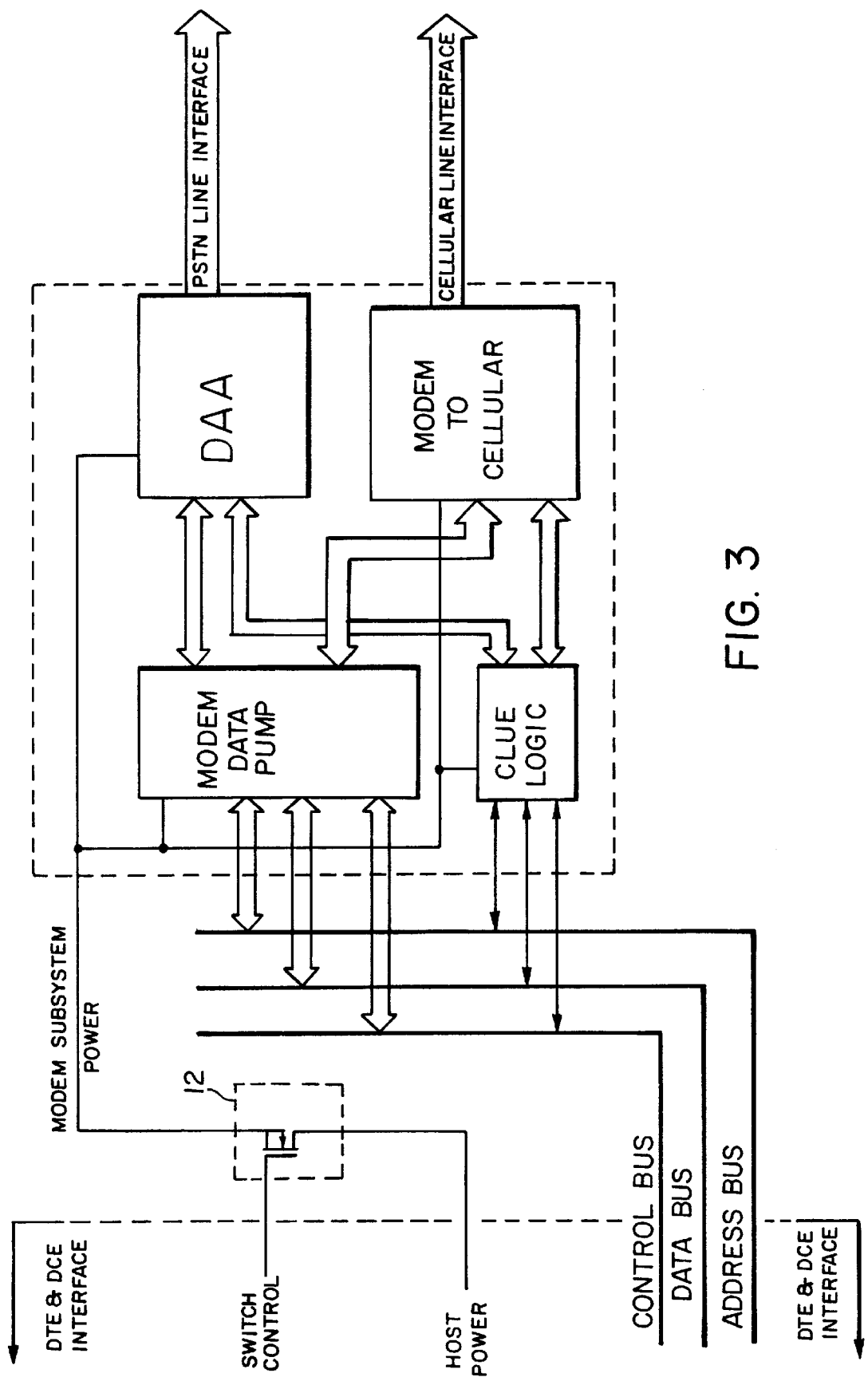
FIG. 3 is a high-level block diagram of a modem subsystem incorporating the present invention.
Figure 4:
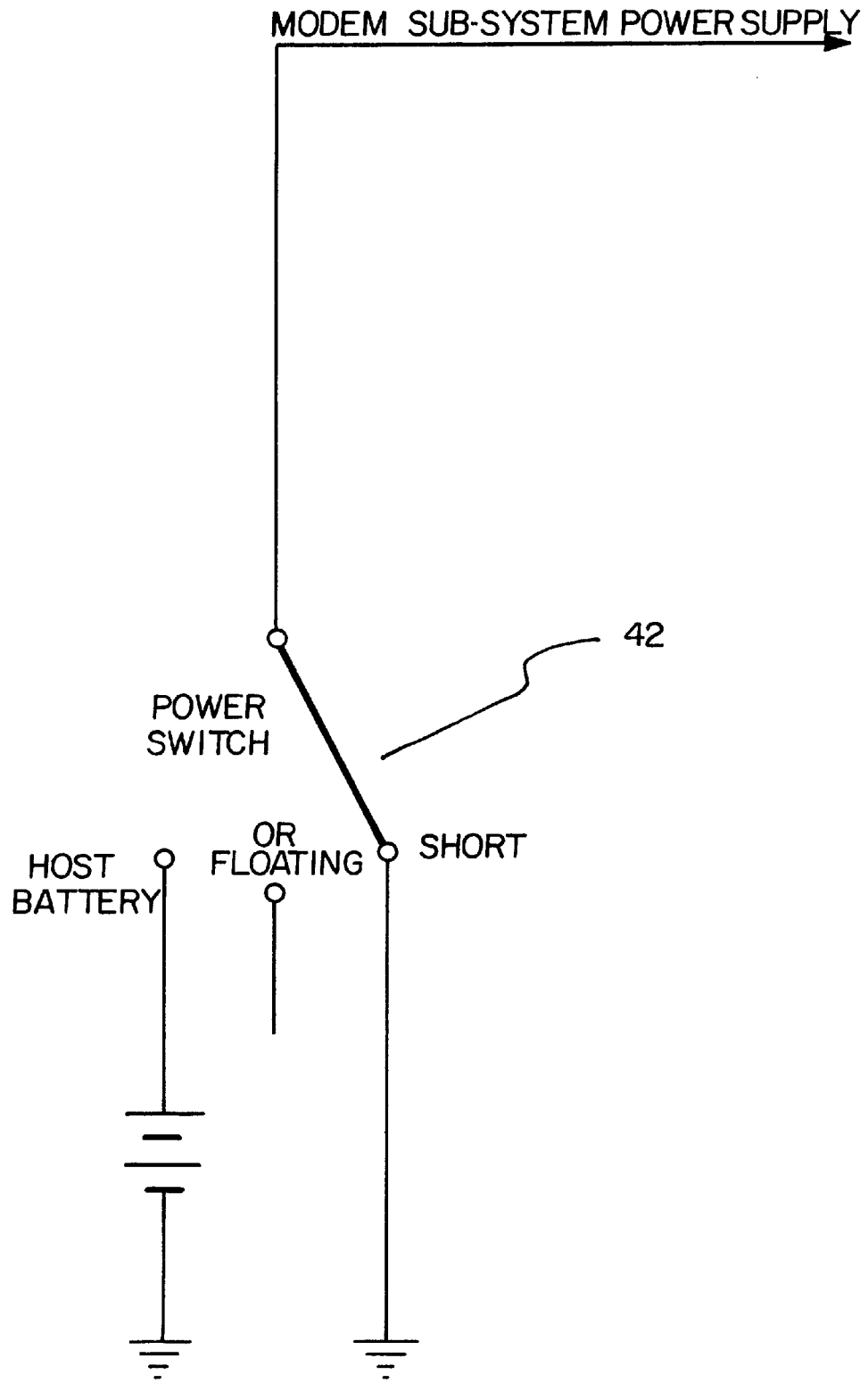
FIG. 4 is a schematic illustrating the operation of a power switch according to the present invention.

FIG. 3 is a high-level block diagram of a modem subsystem incorporating the present invention. The power to the modem subsystem 40 is controlled by a switch 42. The switch may be implemented using a single field effect transistor (FET). As shown in FIG. 4, the FET switch 42 may connect the modem subsystem 40 to either the host power supply, ground, or it may leave the node floating, as desired. The ESD diodes (not shown) are always connected to the bias voltage, without interruption. Notice that the present invention can be implemented using only a single FET and one extra power node. With one additional power control pin from the host microcontroller (to control the power switch 42), the power ON and power OFF procedures can easily be implemented in a variety of operating systems. Thus, the present invention does not require significant additional power consuming power circuitry in order to provide power management capabilities. In addition, the present invention may be implemented with minimal cost.

Figure 5:
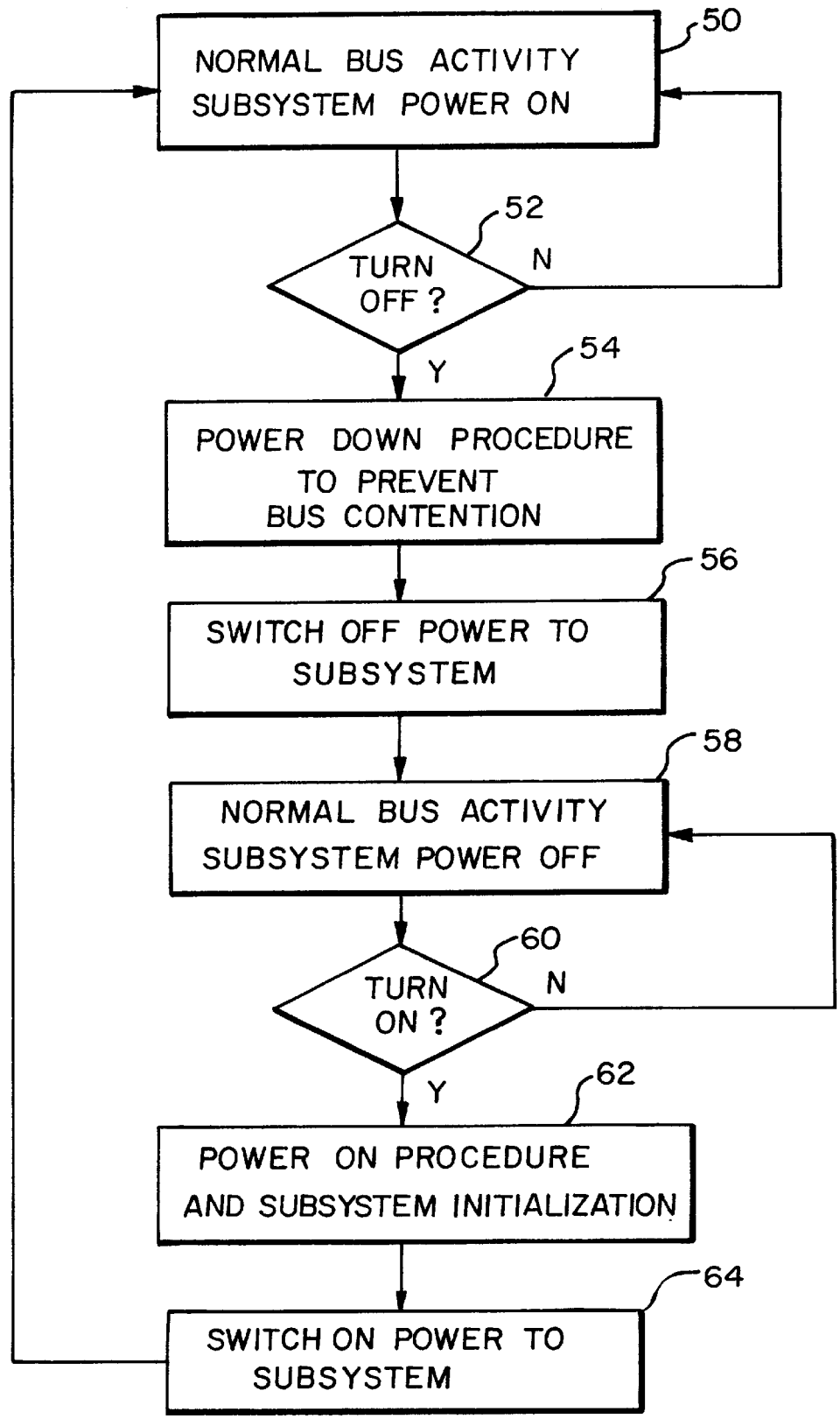
FIG. 5 is a flowchart of the power management procedure according to the present invention.

FIG. 5 is a flow chart illustrating the subsystem power procedure according to the present invention. At step 50, normal bus activity occurs and the subsystem power is on. At decision block 52, if the modem subsystem can be turned off (according to some predetermined inactivity parameters), the power down procedure is implemented at step 54. The power down procedure is illustrated in detail in FIG. 6. First, all system bus activities are halted to insure that there are no bus contention problems. All ESD bias voltages are held constant. Then, all subsystem activities are halted. The power to the subsystem power node is then removed (step 56). After a sufficient time interval to insure that the subsystem discharge has stabilized, the system bus activities may be restored. Since the ESD bias voltages to the subsystem have been held constant, there are no bus contention problems caused by floating nodes.

At step 58, with the subsystem off, the system engages in normal bus activity. Once a power on request is detected, however, the power on procedure (step 62) is performed. This power on procedure is illustrated in detail in FIG. 7. First, all the system bus activities are halted, and then all subsystem activities (if any) are halted. The power to the subsystem is then restored by applying power to the subsystem power node (step 64). The system bus and the subsystem activities are restored after a sufficient time interval to allow all voltage levels to stabilize. Finally, the subsystem functions are reset (by the host) to insure that the subsystem is in a known operational state in order to prevent lock-ups.

According to testing, implementation of the present invention can reduce the current drain of an embedded modem subsystem to approximately 0.1 $\mu A$ in the powered clown state. As stated previously, prior art power management techniques draw approximately 6–8 mA. Thus, the present invention provides a significant improvement in power management for embedded subsystems. The present invention is also independent of any specific microcontroller or operating system, and may therefore be applied to many different configurations.

The present invention has been described with reference to a preferred embodiment, specifically an embedded modem subsystem. As those skilled in the art will recognize, however, the present invention may be applied to any similar electronic embedded subsystem which has a similar tri-state output driver-isolated gate FET connected to the interface bus.

Those skilled in the art will appreciate that various adaptations and modifications of the just-described preferred embodiments can be configured without departing from the scope and spirit of the invention. Therefore, it is to be understood that within the scope of the appended claims, the invention may be practiced other than as specifically described herein.

What is claimed is:

1. A power management control circuit for managing power of an embedded electronic subsystem, comprising:

an embedded electronic subsystem having a first section, and a second section, the second section including a first electrostatic discharge (ESD) diode and a second ESD diode connected between the first ESD diode and a ground node;

a subsystem power node conned to the first section of the embedded electronic subsystem;

a bias voltage node connected to the first ESD diode of the second section; and a power switch connected between a power supply and the subsystem power node.

2. The circuit of claim 1, wherein the power switch is a field effect transistor (FET).

3. The circuit of claim 2, wherein the power switch is switched to remove power to the subsystem power node when the subsystem is not in use.

4. The circuit of claim 3, wherein the subsystem is a modem.

5. The circuit of claim 3, wherein the subsystem has a tri-state isolated gate transistor output driver.

6. A power management control method for removing power from an embedded electronic subsystem connected to a system bus, the subsystem comprising a subsystem power node connected to a first section of the subsystem, a bias voltage node connected to a second section of the subsystem, and a power switch connected between the subsystem power node and a power supply, the method comprising the steps of:

halting all system bus activities;

maintaining a bias voltage on the bias voltage node;

halting all subsystem activities;

switching the power switch to remove power to the subsystem power node; and resuming system bus activities after a sufficient time interval for subsystem discharge to stabilize.

7. A power management control method for restoring power from an embedded electronic subsystem connected to a system bus, the subsystem comprising a subsystem power node connected to a first section of the subsystem, a bias voltage node connected to a second section of the subsystem, and a power switch connected between the subsystem power node and a power supply, the method comprising the steps of:

halting all system bus activities;

halting all subsystem activities;

switching the power switch to supply power to the subsystem power node;

resuming system bus activities after a sufficient time interval for all voltage levels to stabilize; and resetting the embedded subsystem.

8. The method of claim 6, wherein the embedded subsystem is a modem.

9. The method of claim 7, wherein the embedded subsystem is a modem.

10. A power management method for managing power supplied to an embedded electronic subsystem connected to a system bus, the subsystem comprising a subsystem power node connected to a first section of the embedded electronic subsystem, a bias voltage node connected to a second section of the embedded electronic subsystem, and a power switch connected between a power supply and the subsystem power node, the method comprising the steps of:

removing power to the subsystem, wherein the step of removing power comprises the steps of halting all system bus activities;

maintaining a bias voltage on the bias voltage node;

halting all subsystem activities;

switching the power switch to remove power to the subsystem power node; and resuming system bus activities after a sufficient time interval for subsystem discharge to stabilize; and restoring power to the subsystem, wherein the step of restoring power comprises the steps of halting all system bus activities;

halting all subsystem activities;

switching the power switch to supply power to the subsystem power node;

resuming system bus activities after a sufficient time interval for all voltage levels to stabilize; and resetting the embedded subsystem.

11. The method of claim 10, wherein the second section comprises at least one electronic static discharge (ESD) diode.

12. The method of claim 10, wherein the second section comprises two electronic static discharge (ESD) diodes.

13. The method of claim 12, wherein the bias voltage node biases the ESD diodes.

14. The method of claim 13, wherein the power switch is a field effect transistor (FET).

15. The method of claim 10, wherein the subsystem is a modem.

16. The method of claim 10, wherein the subsystem has a tri-state isolated gate transistor output driver.

17. An embedded electronic subsystem, comprising:

a power node;

a first section connected to the power node;

a bias voltage node;

a second section connected to the bias voltage node;

a pad connected between the first and second sections;

said second section including a first electrostatic discharge (ESD) diode connected between the pad and the bias voltage node, and a second (ESD) diode connected between the pad and ground; and a power switch connected between a power supply and the power node.

* * * * *